(No Model.)
W. L. DAVIS.
CAR STARTER AND BRAKE.
No. 469,776. Patented Mar. 1, 1892.
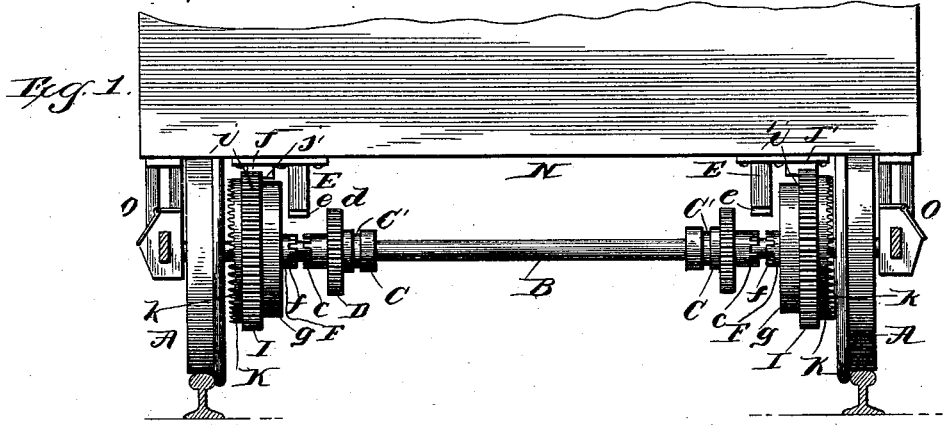
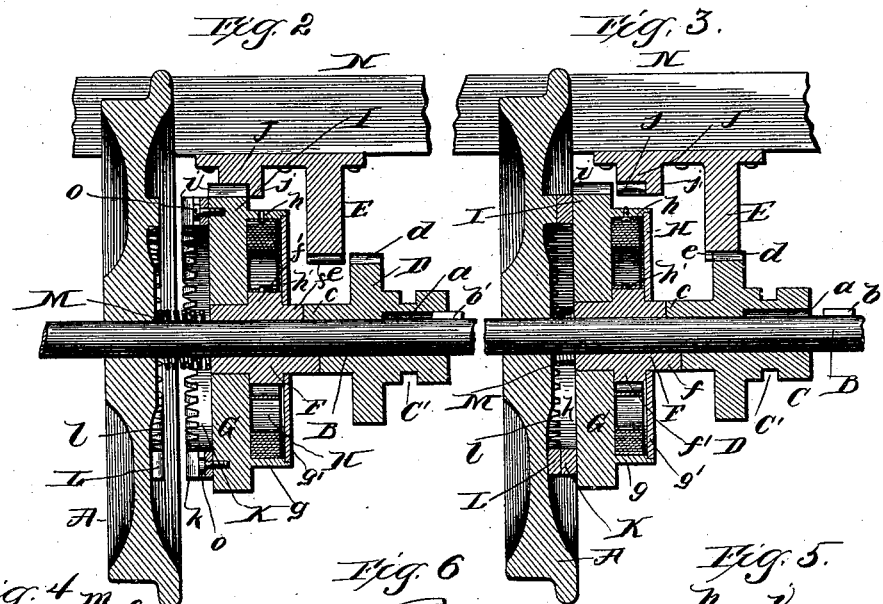
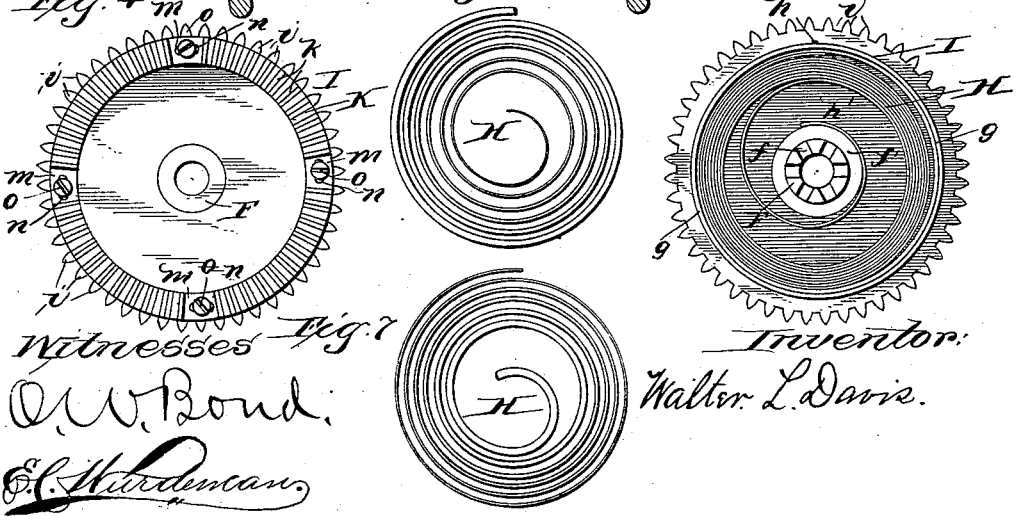
Witnesses
O. W. Bond.
E. C. Wiedeman.
Inventor:
Walter L. Davis.

UNITED STATES PATENT OFFICE.

WALTER L. DAVIS, OF CHICAGO, ILLINOIS.

CAR STARTER AND BRAKE.

SPECIFICATION forming part of Letters Patent No. 469,776, dated March 1, 1892.

Application filed May 1, 1891. Serial No. 391,202. (No model.)

*To all whom it may concern:*

Be it known that I, WALTER L. DAVIS, a citizen of the United States, residing at Chicago, in the county of Cook and State of Illinois, have invented certain new and useful Improvements in Momentum or Power Retainers and Power-Transmitters; and I do hereby declare that the following is a full, clear, and exact description of the invention, which will enable others skilled in the art to which it pertains to make and use the same, reference being had to the accompanying drawings, forming a part hereof, in which—

Figure 1 is an elevation showing the mechanism applied to a street-car. Fig. 2 is a sectional elevation showing the parts in position for winding the spring. Fig. 3 is a sectional elevation showing the parts in position for transmitting the retained power in the spring to the wheel and axle. Fig. 4 is a face view of the barrel-plate and the gear connected therewith. Fig. 5 is a face view of the barrel and the loose arbor for the spring. Figs. 6 and 7 are views showing different forms of power retaining and transmitting springs.

The object of this invention is to construct a simple and effective mechanism by which momentum or power can be retained and be utilized in transmitting power for starting purposes; and the nature of the invention consists in the several parts and combinations of parts hereinafter described, and pointed out in the claims as new.

The invention is shown in connection with a street-car for the purpose of starting the car; but it can be applied to and used with other devices and machinery for the purpose of retaining and transmitting power.

In the drawings, A represents the wheel of a street-car.

B is the axle, connecting the two wheels as usual.

C is a sliding clutch, mounted on the axle B so as to be free to slide longitudinally on the axle and connected with the axle by a groove $a$ in the clutch and a spline or key $b$ on the axle B, so that when the groove and spline or key are engaged the clutch C will revolve with the axle and when the groove and spline are disengaged the axle is free to revolve without transmitting rotation to the clutch, and instead of a single groove and a single spline or key two or more grooves and splines can be used, if so desired. The engaging end of the clutch C is provided with an engaging face $c$, formed of teeth and grooves, and, as shown, the opposite end of the clutch C has a groove $C'$ for the attachment of the end of a shifting lever, which lever and its attachment to the clutch can be of any usual and well-known form suitable for the purpose for which the mechanism is to be used.

D is a gear-wheel formed with or firmly secured to the clutch C and having on its periphery cogs or leaves $d$.

E is a rack having cogs or teeth $e$ to mesh with the cogs or leaves $d$ of the gear D, and in order to insure the engagement of the gear with the rack the cogs or leaves can be formed with a knife or taper edge on the entering face, so that when the clutch is moved for the gear D to engage the rack E the cogs or leaves will enter and engage one with the other.

F is an arbor loosely mounted on the axle or shaft B and having an engaging face $f$, provided with teeth and grooves to engage with the teeth and grooves of the face $c$ of the clutch C, and this arbor, as shown, has a raised portion $f'$ for the attachment of the power-spring.

G is a barrel-plate for the power-spring, which plate is loosely mounted on the arbor F, and has on one side a wall $g$, encircling the center $f'$ of the arbor F, which wall forms a chamber for the reception of the power-spring, and this chamber is closed by a plate $g'$, also loosely mounted on the arbor F, but fitting snugly within the wall $g$.

H is the power-spring, one end of which is attached to the bearing-face $f'$ of the arbor F by a pin $h'$, and the outer end of which is attached to the inner face of the wall $g$ by a pin $h$, as shown in Figs. 2 and 3.

I is a rim or ring on the periphery of the wall or plate G and having on its periphery leaves or cogs $i$, forming a gear.

J is a rack having cogs or leaves $j$, which mesh with the cogs or leaves $i$ of the gear I, and having also a flange $j'$, against which the cogs or leaves $i$ will abut and limit the inthrow of the gear I, and with such gear limit the end movement of the spring and its arbor.

K is a gear on the face of the plate or wall G, which gear has spur cogs or leaves $k$ in the form of construction shown, and this gear is attached to the face of the wall or plate G by cutting away the cogs or leaves $k$ at different points to leave an opening $m$ and forming a slot $n$ in the gear-body at each opening $m$, through which slot a screw $o$ is passed, entering the wall or plate G, as shown in Figs. 2 and 4, and this attachment of the gear K to the wall or plate G allows of a little play for the gear, by which the engagement of the gear under all circumstances is assured.

L is a gear formed with or firmly attached to each wheel A, and each gear L is formed with spur cogs or leaves $l$, corresponding to the spur cogs or leaves $k$ and engaging with the cogs or leaves $k$ when power is to be transmitted to the wheel from the spring.

M is a coiled spring located between the end face of the arbor F and the wheel A, as shown in Figs. 2 and 3, which spring M is for the purpose of throwing the arbor F, with the plate G and the parts connected therewith, away from the gear L and holding the arbor and the parts disconnected, except when forced into engagement by the advance of the clutch C.

N is the bottom of the car or other support, to which the racks E and J are attached by plates and bolts or in any other suitable manner.

The clutch C is slipped on its shaft or axle B so as to be free to slide longitudinally on such shaft or axle, and is connected with the shaft or axle so as to revolve therewith by means of the groove $a$ and the spline $b$ or in any other suitable manner which will allow of the engagement and disengagement of the clutch with and from its shaft or axle. The barrel F, with the plate or wall G and spring H, attached to the arbor F and to the wall $g$, and the chamber for the spring closed by the plate $g'$, is slipped loosely on the shaft or axle B to have the clutch end $c$ of the clutch C engage with the clutch end $f$ of the arbor F with the movement of the clutch C, and the spring M is slipped onto the shaft or axle B to engage with the arbor F at one end and have its other end engage with the face of the wheel A, which wheel, with its gear L, is secured on the end of the shaft or axle B in any usual and well-known manner, and the gear K is attached to the wall or plate G before such wall or plate is slipped onto the arbor F, and the spring H is attached to the arbor and to the wall $g$ before the arbor is slipped onto the axle or shaft.

The rack E and the rack J can be attached to or formed with a single attaching-plate, as shown, or they can be formed with or attached to separate attaching-plates, and these racks are attached to the bottom of the car or other support in such relation to each other and to the gear D and the gear I as that the gear I will be engaged with its rack J when the wall or plate G is carried inward by the spring M, as shown in Figs. 1 and 2, in which position the gear I will be held stationary by the rack J, and the holding of such gear stationary holds the plate or wall G stationary by the engagement of the cogs or leaves of the rack J with the cogs or leaves of the gear I. The engagement of the gear I with its rack J will be had when the clutch end $c$ is disengaged from the clutch end $f$ of the arbor F, as shown in Fig. 1, and the gear I will be in engagement with its rack J when the clutch end $c$ of the clutch C is engaged with the clutch end $f$ of the arbor F, as shown in Fig. 2, and with this engagement of the gear I and its rack J the gear D is not in engagement with its rack E; but the relation of the rack E to the rack J is one that with the further advance of the clutch C to bring the parts into the position shown in Fig. 3 the gear D will engage its rack E before the gear I is disengaged from its rack J and before the gear K is engaged with the gear L, so that with the disengagement of the gear I from its rack J the gear D will be engaged with the rack E, and such engagement will be had before the gears K and L engage.

The operation is as follows: When the car is traveling, the power retaining and transmitting mechanism is in the position shown in Fig. 1, with the clutch C disengaged from the arbor F and with the gear-wheel D disengaged from the rack E and the gear I engaged with the rack J, and with the parts in this position the travel of the wheel A revolves the shaft B, which turns in the arbor F without revolving the arbor, so that the spring H remains unwound, and with this condition of the parts the clutch C is engaged with the shaft or axle B, through the groove $a$ and the spline or key $b$, and revolves with the shaft or axle. The parts remain in the relation shown in Fig. 1 until it is desired to stop the car, at which time the clutch C is moved outward for its clutch end $c$ to engage with the clutch end $f$ of the arbor F, as shown in Fig. 2, and with such engagement of the clutch C and the arbor F, with the clutch locked to the shaft or axle B and revolving with such shaft or axle, the arbor F will also be revolved with the axle, and such revolving of the arbor F will wind up the spring H, as the wall or plate G is locked or held firmly by the engagement of the gear I with the rack J, which holds the wall $g$, to which the outer end of the spring is attached, stationary, winding the spring from the center on the arbor F, and such winding of the spring will act as a retarding means for the stopping of the car, and at the same time the momentum of the car will be taken up or transmitted to the spring, to be there used for starting the car after the stop. The starting of the car is had by bringing the parts into the position shown in Fig. 3, which is accomplished by carrying the clutch C still farther outward for the gear D to engage the rack E and the gear I to be released from the rack J and the gear K to mesh with the gear L, and when the gears K and L are meshed together the gear I is fully released from the rack J and the gear D is firmly held by the rack E, and such locking of the gear D with the rack E locks and holds the gear D stationary and with it the clutch C, and as the clutch end c is engaged with the clutch end f of the arbor F, the arbor is likewise held stationary, and as the gear I is released from its holding-rack J the spring is free to uncoil from the center outward, revolving the gear K in a forward direction, transmitting such movement from the gear L to the wheel A, and thereby starting the car. It will be seen that with the parts disconnected, as shown in Fig. 1, no interference from the power retaining and transmitting mechanism is had to a free revolving of the shaft or axle B; that with the first engagement of the clutch ends c and f the arbor is locked with the axle or shaft and must turn therewith, winding up the spring, the force of which acts to retard the revolution of the shaft or axle and to stop the car, and with a still further movement of the clutch C the clutch is locked and the arbor is locked, while the arbor-barrel is released and the power-gear of the barrel engaged with the power-gear of the wheel for the recoil of the spring to transmit power to the wheel in a forward direction, and this locking of the parts together to transmit the momentum or power in stopping to the spring and the release of the retained power of the spring is had by and through the engagement of a lock-clutch on the shaft or axle and a loose spring-arbor on the same shaft or axle, so that the movement of the clutch must engage the parts to retain the power in the spring, and such retained power is utilized in starting the car. A power retaining and transmitting mechanism is applied to each end of the shaft or axle B, so that both wheels of the car will receive a forward impetus at one and the same time, thereby insuring a starting of the car, and the two mechanisms are located and arranged so as to work simultaneously, both in winding the springs of the respective arbors and in releasing the springs and engaging the wheels A, and the clutches C can be operated from one and the same lever by the driver or operator of the car. The mechanism can be applied to horse, cable, or other cars, and will perform its work in an efficient and reliable manner, as the engagement of the clutch with a loose arbor must of necessity turn such arbor and wind up the spring, and with the release of the barrel of the spring from its locking-rack and at the same time holding the arbor stationary by the locked clutch the recoil of the spring must be from the center outward, thereby turning the power-gear forward and revolving the wheels. The spring used can be a straight spring—that is, of uniform diameter—as shown in Fig. 5, in which case the power will be equal in stopping and starting; or it can be a spring of greater thickness at the outer end than at the center, as shown in Fig. 6, in which case the power in stopping the car will be weaker and the resultant power in starting the car will be greater; or it can be a spring of greater thickness at the center than at the outer end, as shown in Fig. 7, in which case the power in stopping will be greater and the resultant power for starting will be less, and either form of spring can be used, as may be desired. The winding of the spring in stopping the car is from the outside to the center, as the loose arbor is locked with the axle through the sliding clutch and revolves with the axle, and when the power of the spring is to be utilized the arbor and clutch are locked together and the clutch is locked stationary by its gear and rack, so that the recoil of the spring will be from the center out, as the barrel of the spring will revolve on the arbor, and as the power-gear K is near the periphery of the barrel the full force of the recoil is had in driving or imparting motion to the wheel A through the gear L. The gears K and L have the edge of their cogs or leaves of a knife-edge or rounded form, so as to insure the locking together of the gear, and in order to prevent any liability of the gear not engaging, the gear K is attached, as shown and described, by the slots n and screws o, which permits a slight movement of the gear K on the plate or wall G, so that the cogs or leaves must slide one within the other of the two gears K and L. The entering end or side of the gear D and the receiving end or side of the rack E can have the ends of their respective cogs or leaves d and e also formed with a knife-edge or rounded, so as to insure the entering of the gear D into its locking-rack E, and the entering and receiving ends of the cogs or leaves i and j can be likewise formed with a knife or rounded edge, so as to insure the entering of the gear I into its locking-rack J in the movement of the parts. The releasing of the mechanism is had by moving the clutch C inward, which withdraws the clutch end c from the clutch end f of the arbor F, and with such inward movement of the clutch C the spring M will act and force the arbor with the plate or wall G, the spring H, the gear I, and the gear K inward as a whole, releasing the gear K from the gear L and engaging the gear I with the rack J, and the limit of the inward movement of the arbor and the parts connected therewith is had by the flange j', against which the end face of the cogs or leaves i will strike and stop further inward movement of the parts; but the clutch C is moved sufficiently far inward to release the clutch ends c and f one from the other, so that the arbor is free from the clutch and the shaft or axle B is free to revolve without moving the loose arbor F and bringing the parts into the position shown in Fig. 1.

The mechanism will be found well adapted for use in connection with a horse, cable, or other street-car, and will furnish through the winding up of the power-springs H a brake for stopping the cars; but in case a quicker stop is desired than could be had from the length of time required to wind up the spring such stop could be made by the use of the ordinary brakes on street-cars, with the use of which the mechanism will not at all interfere.

The principle of retaining power through the medium of a spring wound up by a loose arbor on a shaft and when released have the retained power loosen to operate and revolve or drive the shaft can be utilized where it is desired to have the momentum or power in stopping a shaft operate as a propelling means for starting the shaft.

What I claim as new, and desire to secure by Letters Patent, is—

1. The combination, in a power retaining and transmitting mechanism, of a shaft, a sliding clutch on the shaft, a loose arbor on the shaft engaged by the sliding clutch, a geared barrel mounted on the arbor, a lock for the geared barrel engaged and disengaged by the sliding of the geared barrel on the shaft, and a power-spring attached to the arbor and to the geared barrel for winding and releasing the spring to retain and transmit power, substantially as specified.

2. The combination, in a power retaining and transmitting mechanism, of a shaft, a sliding clutch on the shaft, a loose arbor on the shaft engaged by the sliding clutch, a barrel mounted on the loose arbor, a lock for the geared barrel engaged and disengaged by the sliding of the barrel on the shaft, a power-spring connected with the loose arbor and with the barrel, a gear on the barrel and a coacting gear on the wheel to be driven, substantially as and for the purposes specified.

3. The combination, in a power retaining and transmitting mechanism, of a shaft, a sliding clutch on the shaft, a loose arbor on the shaft and engaged by the sliding clutch, a barrel mounted on the loose arbor, a power-spring connected with the loose arbor and with the gear, a gear on the barrel, and a lock for engaging the gear of the barrel and holding the barrel stationary, substantially as and for the purposes specified.

4. The combination, in a power retaining and transmitting mechanism, of a shaft, a sliding clutch on the shaft, a loose arbor on the shaft and engaged by the sliding clutch, a barrel mounted on the loose arbor, a power-spring connected with the loose arbor and with the barrel, a gear on the barrel, a lock engaging the gear and holding the barrel stationary, and a power-transmitting gear on the barrel, substantially as and for the purposes specified.

5. The combination, in a power retaining and transmitting mechanism, of a shaft, a sliding clutch on the shaft, a loose arbor on the shaft and engaged by the sliding clutch, a barrel mounted on the loose arbor, a power-spring connected with the loose arbor and the barrel, a gear on the barrel, a stop engaging the gear and holding the barrel stationary, a power-transmitting gear on the barrel, and a power-transmitting gear engaged by the power-gear on the barrel, substantially as and for the purposes specified.

6. The combination, in a power retaining and transmitting mechanism, of a shaft, a sliding clutch on the shaft, a gear on the sliding clutch, and a lock engaged with the gear for holding the clutch stationary when disengaged from the shaft and disengaged from the gear for releasing the clutch when engaged with the shaft by the sliding of the clutch on the shaft, substantially as and for the purposes specified.

7. The combination, in a power retaining and transmitting mechanism, of a shaft, a sliding clutch on the shaft, a gear on the sliding clutch, a lock engaged with and disengaged from the gear by the sliding of the clutch on the shaft for holding the clutch stationary when disengaged from the shaft and releasing the clutch when engaged with the shaft, a loose arbor on the shaft and engaged by the sliding clutch, and a power-spring wound on the loose arbor, substantially as and for the purposes specified.

8. The combination, in a power retaining and transmitting mechanism, of a shaft, a sliding clutch on the shaft, a gear on the sliding clutch, a lock engaging the gear and holding the clutch stationary when disengaged from the shaft, a loose arbor on the shaft and engaged by the sliding clutch, a barrel mounted on the loose arbor, and a power-spring connected with the loose arbor and with the barrel, substantially as and for the purposes specified.

9. The combination, in a power retaining and transmitting mechanism, of a shaft, a sliding clutch on the shaft, a gear on the sliding clutch, a lock engaging the clutch-gear and holding the clutch stationary when disengaged from the shaft, a loose arbor mounted on the shaft and engaged by the sliding clutch, a barrel mounted on the loose arbor, a power-spring connected with the loose arbor and with the barrel, a gear on the barrel, and a lock engaging the gear and holding the barrel stationary, substantially as and for the purposes specified.

10. The combination, in a power retaining and transmitting mechanism, of a shaft, a sliding clutch on the shaft, a gear on the sliding clutch, a lock engaging the gear and holding the clutch stationary when disengaged from the shaft, an arbor loosely mounted on the shaft, a barrel mounted on the arbor, a power-spring connected with the loose arbor and with the barrel, a gear on the barrel, a lock engaging the barrel-gear and holding the barrel stationary, and a power-transmitting gear on the barrel, substantially as and for the purposes specified.

11. The combination, in a power retaining and transmitting mechanism, of a shaft, a sliding clutch mounted on the shaft, a loose arbor on the shaft and engaged by the sliding clutch, and a power-spring wound by the loose arbor from the engagement of the clutch, substantially as and for the purposes specified.

12. The combination, in a power retaining and transmitting mechanism, of a sliding clutch and a lock for holding the clutch when disengaged from the shaft, a loose arbor on the shaft engaged by the sliding clutch, a power-spring wound from the loose arbor by the engagement of the clutch with the arbor, and a lock for holding the power-spring against recoil when wound, substantially as and for the purposes specified.

13. The combination, in a power retaining and transmitting mechanism, of a shaft, a sliding clutch mounted on the shaft, a loose arbor on the shaft engaged by the sliding clutch, a power-spring wound by the loose arbor from the engagement of the clutch, and a lock for the clutch and for the power-spring, coacting to lock the clutch with the release of the spring, substantially as and for the purposes specified.

14. The combination, in a power retaining and transmitting mechanism, of a shaft, a sliding clutch on the shaft, a loose arbor on the shaft and engaged by the sliding clutch, a barrel mounted on the loose arbor, a power-spring connected with the loose arbor and with the barrel and wound by the loose arbor from the engagement of the power-clutch, and a lock for the clutch and for the barrel, coacting to lock the clutch with the release of the barrel and spring to unwind the spring from the center outward, substantially as and for the purposes specified.

15. The combination, in a power retaining and transmitting mechanism, of a shaft, a sliding clutch on the shaft, a loose arbor on the shaft and engaged by the sliding clutch, a spring wound from the loose arbor by the engagement of the clutch, a barrel mounted on the loose arbor and carrying the power-spring, a power-gear on the barrel, and a spring for disengaging the power-gear with the release of the clutch, substantially as and for the purposes specified.

16. The combination, in a power retaining and transmitting mechanism, of a sliding clutch mounted on a shaft, a loose arbor on the shaft and engaged by the sliding clutch, a power-spring wound from the loose arbor by the engagement of the clutch, a barrel carrying the power-spring and having a power-transmitting gear, and a lock for the sliding clutch and the barrel for holding the clutch and barrel stationary in winding and unwinding the power-spring, substantially as and for the purposes specified.

17. The combination, in a power retaining and transmitting mechanism, of a winding-clutch and a lock for holding the clutch stationary when disengaged, a loose arbor engaged by the clutch, a power-spring wound from the loose arbor by the engagement of the clutch, and a lock for holding the spring when winding, substantially as and for the purposes specified.

18. The combination, in a power-retaining and transmitting mechanism, of a winding-clutch, a lock holding the clutch stationary when disengaged, a loose arbor engaged by the winding-clutch, a spring wound from the loose arbor by the engagement of the clutch, a barrel carrying the spring and a power-transmitting gear, and a lock for the barrel holding the barrel stationary in winding the spring and releasing the barrel with the engagement of the lock for the winding-clutch to unwind the spring and operate the power-transmitting gear, substantially as and for the purposes specified.

19. The wheel A, shaft B, clutch C, having the clutch end c, and arbor F, having the clutch end f and loosely mounted on the shaft B, in combination with the plate G and spring H for winding the spring to transmit power, substantially as and for the purposes specified.

20. The wheel A, shaft B, sliding clutch C, and loose arbor F on the shaft B, having a clutch end f engaged by the clutch end c of the sliding clutch C, in combination with the plate G, spring H, gear I, and locking-rack J, substantially as and for the purposes specified.

21. The wheel A, shaft B, sliding clutch C, having the clutch end c, and loose arbor F, having the clutch end f, in combination with the plate G, spring H, gear I, locking-rack J, gear K, and gear L on the wheel A, substantially as and for the purposes specified.

22. The wheel A, shaft B, sliding clutch C, having the clutch end c, gear D on the clutch C, and locking-rack E for the gear D, in combination with the loose arbor F, having the clutch end f, plate G, spring H, gear I, and locking-rack J, substantially as and for the purposes specified.

23. The wheel A, shaft B, sliding clutch C, having the clutch end c, gear D on the clutch C, and locking-rack E for the gear D, in combination with the loose arbor F, having the clutch end f, plate G, spring H, gear I, locking-rack J for the gear I, transmitting-gear K on the plate G, and transmitting-gear L on the wheel A, substantially as and for the purposes specified.

24. The plate G and transmitting-gear K, connected with the plate G by the slots n and screws o, in combination with the transmitting-gear L for insuring the engagement of the gears K and L, substantially as specified.

25. The loose arbor F, plate G, having the wall g, and spring H, connected with the arbor F and wall g, in combination with the gear I on the plate G and locking-rack J for the gear I for holding the plate stationary in winding the spring H from the arbor F, substantially as and for the purposes specified.

26. The sliding clutch C, gear D, and locking-rack E, in combination with the arbor F, plate G, spring H, wound from the arbor F, gear I on the plate G, and locking-rack J for locking and releasing the sliding clutch C and the plate G, substantially as and for the purposes specified.

WALTER L. DAVIS.

Witnesses:
O. W. BOND,
FRANK W. ROBINSON.